Aug. 11, 1959     F. PERNACK     2,898,670
HELICAL BROACH
Filed Dec. 5, 1955
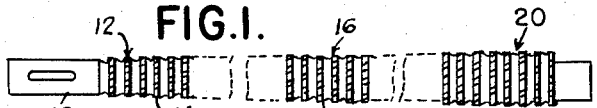
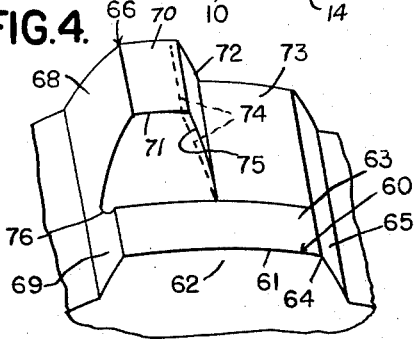
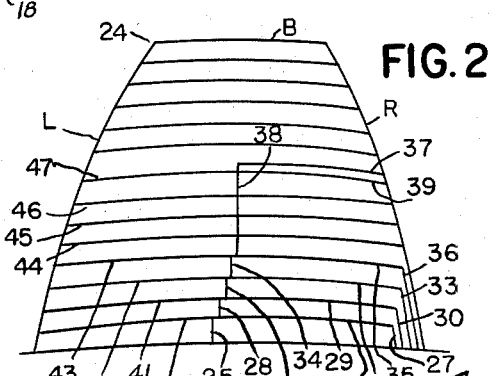
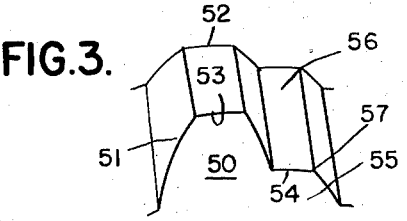
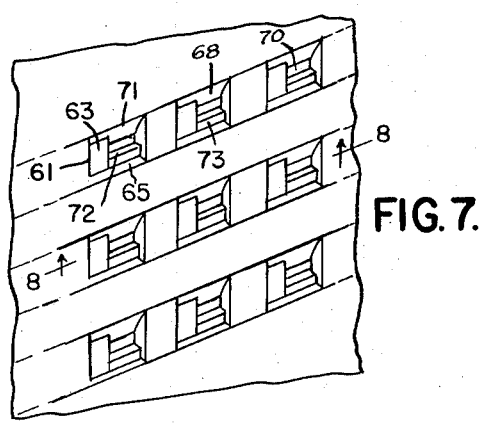
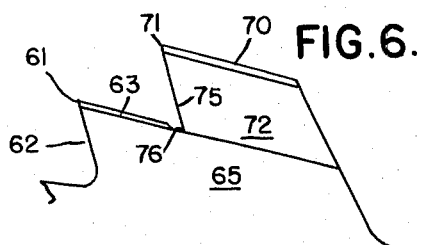
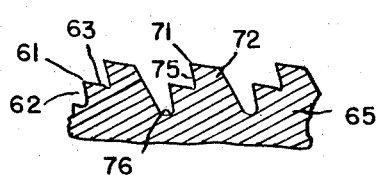
INVENTOR.
FRANK PERNACK
BY Whittemore
Hulbert & Belknap
ATTORNEYS United States Patent Office 2,898,670
Patented Aug. 11, 1959

2,898,670

HELICAL BROACH

Frank Pernack, Birmingham, Mich., assignor to National Broach & Machine Company, Detroit, Mich., a corporation of Michigan Application December 5, 1955, Serial No. 551,042

2 Claims. (Cl. 29—95.1)

The present invention relates to a helical broach characterized by the provision of recutting teeth of special design.

Generally, the broaching of internal helical teeth in a work piece is accomplished in an operation in which a broach having helically aligned cutting teeth is forced through the opening in a work piece and has a rotation impartred thereto to cause the helically disposed teeth to move in corresponding helical paths. If the work piece is held stationary as the broach is drawn through, the result is the cutting of accurate helical teeth in the work piece. However, it is ordinarily desirable to avoid the necessity of clamping the work piece, and it has been found in such case that during the initial cutting, that is while the first few sets of helically aligned teeth of the broach are initiating a cut in the work piece, the work piece tends to rotate slightly and to cause a relative circumferential drift between the work piece and broach.

In another system of broaching, either the broach or the work piece is mounted for free rotation while the other part is held against rotation. In this case the engaged member is rotated as a result of engagement between the helically aligned teeth of the broach and the corresponding helically formed teeth on the work piece as they are being cut. In this case also, the cutting action of the first few sets of helically aligned teeth is such as to produce mutilation at one side of the tooth space.

After a certain number of teeth have engaged the work piece and cut to a predetermined depth, a true helical guiding action is thereafter maintained. However, the first few teeth which were subjected to lateral or circumferential drift will have mutilated one side of a tooth space in the work piece. In order to remove the mutilated side of the tooth so as to produce perfectly accurate tooth spaces in the work piece, the first series of teeth in the broach is followed by a second series which is referred to as a recruiting series. These teeth in general are wider than the first set and have portions at one side which engage the side of the slot or tooth space formed in the work piece, and at the other side have cutting portions of progressively stepped height to widen the work piece to the required full tooth space width and to remove the mutilated portion thereof.

It is an object of the present invention to provide a series of recutting teeth characterized by a special construction which permits their formation with substantially less grinding time than has been required previously.

More specifically, it is an object of the present invention to provide recutting teeth having front cutting portions the top surfaces of which are circular ground, thus eliminating the necessity of separately grinding the top surface of each tooth portion.

It is a further object of the present invention to provide a series of recutting teeth having cutting portions at the front thereof of progressively stepped height and including a circular ground conical top surface, and guiding portions of uniform height spaced rearwardly from the front cutting portions.

Other objects and features of the invention will become apparent as the description proceeds, especially when taken in conjunction with the accompanying drawings, wherein:

Figure 1 is a diagrammatic view of a broach illustrating the arrangement of different operating sections thereof.

Figure 2 is a diagrammatic view of a tooth space in a work piece showing the sequence of cuts taken by the teeth of a broach.

Figure 3 is a perspective view of a recutting tooth as constructed in accordance with the prior art.

Figure 4 is a perspective view of an intermediate one of a series of recutting teeth constructed in accordance with the present invention.

Figure 5 is a perspective view of a recutting tooth.

Figure 6 is a side elevational view of a recutting tooth.

Figure 7 is a fragmentary development of the broach surface into a horizontal plane.

Figure 8 is a fragmentary sectional view on the line 8—8, Figure 7.

Referring now to the drawings there is illustrated diagrammatically at 10 in Figure 1 a helical broach designed to produce internal helical teeth on a work piece. For purposes of illustration, it is assumed that the teeth on the work piece are to be of involute form although the present invention is applicable to the formation of teeth of any desired shape.

The broach comprises a first section 12 having a series of annular broach blades or cutting ribs indicated at 14. The first few of these may be full cutting circular blades designed to size the hole in the work piece. Thereafter, the blades 14 are interrupted to provide annular series of cutting tooth formations of radially stepped height. Longitudinally of the broach the cutting teeth are helically aligned. After a certain number of teeth have cut the work piece, the tooth slot formed therein has reached sufficient depth so that its engagement with the sides of the cutting teeth is such to maintain true relative helical guiding action. At this time however, some lateral drift will have taken place so that the side of the tooth slot cut by the acute angled corners at the front teeth of the first section of the broach will have been somewhat mutilated. On the other hand, the side of the tooth slot cut by the opposite or front obtuse corner of the broach teeth will not be mutilated but will be a truly formed accurate helical guiding surface.

The first section of the broach is followed by a second or recutting section designated generally at 16 having a series of blades or ribs 18 each of which is interrupted to provide in combination guiding surfaces and cutting edges. The present invention relates to the shape of these recutting teeth and this will be described more completely hereinafter.

The final section of the broach designated 20 includes radially stepped series of blades or ribs 22 each of which is interrupted to provide helically aligned and radially stepped cutting teeth.

Figure 2 is a diagrammatic view of successive cuts taken to form a tooth space. The figure shows the tooth space as viewed from the entering end of the broach teeth or looking in the direction of movement of the broach. It will be understood that Figures 3 and 4 show the front or cutting end of the broach teeth and that these teeth will therefore be reversed and will move through the tooth space away from the viewer and with the guide portions 50 and 66 at the right hand side of the tooth space. The full tooth space as finally cut has a bottom surface B and side surfaces L and R. The first tooth of section 12 of the broach cuts a shallow channel in the surface of the work piece between the lines 25, 26 and 27. The next following helically aligned tooth of section 12 of the broach fails to follow its predecessor through the work piece in exactly the desired helical path, but instead drifts somewhat to the right as seen in Figure 2, and cuts material from the work piece defined between the lines 28, 29 and 30. In like manner, the next following tooth fails to establish a true helical following condition and removes material from the work piece defined between the lines 31, 32 and 33. The next tooth removes material from the tooth space defined between the lines 34, 35 and 36. By this time, or at least by the time the next few teeth have come into action, true helical guiding action is maintained and finally, the last tooth of the first section 12 in the broach is drawn through the tooth space and removes material along the side R and cuts to the depth designated by the line 37. The inner corner of the tooth also cuts along the line 38. At this time therefore, the first series of teeth has cut to the total depth of the line 37 and has established a true involute helicoidal guiding surface along the side R of the tooth space. At the same time, the left hand side of the tooth space as so far formed is mutilated as indicated by the irregular cuts 25, 28, 31 and 34.

Thereafter, the recutting teeth come into action and include portions adapted to engage along the side R of the tooth space, to establish and maintain true guiding action. The recutting teeth extend to a height somewhat less than the line 37, as for example, the line 39, so that these teeth all have top clearance. At the same time, the teeth include portions of full tooth space width which successively cut along the lines 40, 41, 42, 43, 44, 45, 46 and 47, the last line indicating a depth of cut equal or substantially equal to the depth of cut indicated by the line 37. At this time the tooth space of the work piece has been cut to full tooth space width and to a partial depth. Thereafter, the final series of cutting teeth, all of which are of full tooth space width and which are of progressively increasing height, finish the tooth space to the final form as is readily understood.

Referring now to Figure 3 there is shown the shape of a recutting tooth as produced in accordance with the prior art. The left hand portion of this tooth, indicated generally at 50, includes a guiding side surface at the obtuse angle side 51, of the involute or other desired form which is adapted to take bearing against the true helicoidal involute surface R of the tooth space as produced by the first series of teeth. The top surface 52 of the guiding portion 50 of the tooth extends to slightly less height than the height of the last tooth of the first series of teeth as for example to line 39, Figure 2, so that the corner 53 is not a cutting edge and the surface 52 in back of the corner 53 is in clearance.

The actual cutting performed by the recutting teeth is performed by the cutting edge 54 defined by the intersection of the front surface 55 and the top surface portion 56, these edges in successive recutting teeth, cutting to the lines 40–47 in Figure 2. Inasmuch as successive cutting edges 54 are stepped upwardly, some additional cutting is accomplished by the right hand front corner portion of the tooth, as seen in Figure 3 and as designated by the arrow 57. This takes place in increments along the line L of the tooth space as seen in Figure 2.

Inasmuch as it is necessary to control with considerable accuracy the amount of material taken by each tooth, it will be appreciated that to produce the teeth shown in Figure 3, the surface 56 of each tooth must be separately ground so as to provide the proper relief in back of the cutting edge 54 and so as to locate the cutting edge 54 with great accuracy with respect to the location of similar cutting edges on preceding and following teeth. In other words, each tooth of each blade of the broach requires a separate grinding operation to locate the cutting edge 54 in the required position. This is a time consuming and expensive operation.

In accordance with the present invention the recutting teeth are modified as illustrated in Figures 4, 5 and 6. As seen in these figures the teeth are provided with front cutting portions indicated generally at 60 and include a cutting edge 61. The cutting edge 61 is defined by the intersection between the front face 62 of the tooth and the top surface 63 thereof. It will be appreciated that only the right hand side of the corner 61 as seen in Figure 4, constitutes a cutting edge since the left hand side follows along behind teeth of the first series, or in other words, moves through the space defined between the lines R, 37 and 25, 28, 31, 34 and 38. Since successive cutting edges 61 are stepped diametrically some cutting will also be accomplished by a short cutting edge 64 defined by the intersection between the front face 62 and the side surface 65.

In order to maintain accurate guiding action with the helicoidal involute surface produced by the first section or series of teeth, a guiding portion 66 is provided on the recutting teeth, this guiding portion including an upwardly extending portion having an involute side surface 68 forming a continuation of a similar involute helicoidal side surface intersecting the front face 62 of the tooth, as indicated at 69. The top surface 70 of the guiding portion as previously indicated, is preferably of less height than the height of the last tooth of the first series 12 so that the tooth corner 71 is not a cutting edge and the surface 70 is in clearance with respect to the tooth space as already cut.

The guiding portion 66 is of reduced width and the upper rear portion of the tooth is ground away to provide the surfaces 72 and 73. Preferably, the surface 73 is reduced below the surface 63 although this is not essential. The surface 72 is indicated as a helicoidal involute but again, this is immaterial and the surface may be a plane surface as indicated by the dotted lines 74 since the corner 75 does not constitute a cutting edge.

The present invention depends upon the fact that the surface 63 of a complete annular series of recutting teeth may be circular ground in a continuous operation for its advantage in the saving of time. The surface 63 may be ground by a conical wheel while the broach is rotated to bring all of the surfaces 63 of the recutting teeth constituting a complete annular series into sequential engagement. Instead of employing a conical wheel, the wheel may of course be cylindrical with its axis tipped to give the desired top cutting clearance in back of the cutting edge 61.

By this arrangement it is possible to finish grind all of the surfaces 63 of a complete annular series of recutting teeth in a fast operation and thus, to control the position of the cutting edges 61 with great accuracy. The grinding operation which removes the material of the tooth and produces the surfaces 72 and 73 may be a very rapid and rough grinding operation since no accuracy is required.

While the left hand side of the recutting teeth as seen in Figure 4, is essentially a guiding surface, there may be a slight scraping or shaving action taking place, and in order to prevent any variation in cutting or scraping action if any, it is desirable to provide an undercut groove as indicated at 76.

Another important advantage of the present invention is that the surface 63 may be finished by a large diameter grinding wheel, whereas in the production of the teeth as shown in Figure 3, the surfaces 56 require the use of a small wheel to avoid interference with adjacent teeth.

It will of course be evident that resharpening of the broach may be effected by grinding the faces 62 of the teeth.

The drawings and the foregoing specification constitute a description of the improved helical broach in such full, clear, concise and exact terms as to enable any person skilled in the art to practice the invention, the scope of which is indicated by the appended claims.

What I claim as my invention is:

1. In a broach for broaching helical grooves in an opening in a work piece, a generally cylindrical recutting section having a plurality of series of recutting teeth, the teeth of each series being disposed in helical alignment, corresponding teeth of the several series being disposed in circumferential alignment, each tooth having a leading cutting portion having side and top surfaces intersecting the front surface thereof to form cutting edges, said cutting portions being of full groove width, the cutting portions of the successive teeth in each series being of progressively increasing height to cut the grooves in the work piece to increasing depth, the said top surfaces of said cutting portions being surfaces of revolution coaxial with said recutting section, each of said teeth having trailing guide portions integral with said cutting portions and spaced rearwardly therefrom, said guide portions being of uniform height and each having one side portion shaped to conform to and follow the side of the groove in the work piece.

2. Structure as defined in claim 1 in which the said guide portions are of substantially less width than said cutting portions.

References Cited in the file of this patent

UNITED STATES PATENTS

| | | |
|---|---|---|
| 1,376,709 | Lapointe | May 3, 1921 |
| 1,551,036 | Lapointe | Aug. 25, 1925 |
| 1,806,552 | Atwood | May 19, 1931 |
| 2,011,630 | Halborg | Aug. 20, 1935 |
| 2,060,889 | Nilsson | Nov. 17, 1936 |
| 2,078,632 | Halborg | Apr. 27, 1937 |
| 2,199,343 | Lapointe | Apr. 30, 1940 |
| 2,398,310 | Howell | Apr. 9, 1946 |
| 2,683,919 | Psenka | July 20, 1954 |